United States Patent [19]
Takeuchi et al.

[11] Patent Number: 6,075,621
[45] Date of Patent: Jun. 13, 2000

[54] IMAGE SENSING APPARATUS AND SHADING CORRECTION METHOD

[75] Inventors: Minoru Takeuchi; Mitsuo Hirano, both of Iwate-ken, Japan

[73] Assignee: Apls Electric Co., Ltd., Japan

[21] Appl. No.: 08/907,278

[22] Filed: Aug. 6, 1997

[30] Foreign Application Priority Data

Aug. 12, 1996 [JP] Japan .................................. 8-212462
Dec. 16, 1996 [JP] Japan .................................. 8-335891

[51] Int. Cl.⁷ ...................................................... H04N 1/40
[52] U.S. Cl. .......................................... 358/461; 358/296
[58] Field of Search .................................. 382/270, 273, 382/274; 358/461, 464, 468, 446, 296, 401

[56] References Cited

U.S. PATENT DOCUMENTS

| | | | |
|---|---|---|---|
| 4,633,314 | 12/1986 | Kurata et al. | 358/163 |
| 4,970,598 | 11/1990 | Vogel | 358/213.18 |
| 4,980,778 | 12/1990 | Wittman | 358/446 |
| 5,398,119 | 3/1995 | Suzuki et al. | 358/461 |
| 5,500,745 | 3/1996 | Iishiba et al. | 358/461 |

FOREIGN PATENT DOCUMENTS

| | | |
|---|---|---|
| 0200 438 | 11/1986 | European Pat. Off. . |
| 0 439 357 A2 | 7/1991 | European Pat. Off. . |
| 4-368064 | 6/1993 | Japan . |
| 5-153353 | 6/1993 | Japan . |
| 6-6594 | 1/1994 | Japan . |
| 07085269 | 3/1995 | Japan . |
| 1 430 614 | 3/1976 | United Kingdom . |
| WO 91/18470 | 11/1991 | United Kingdom . |

*Primary Examiner*—Cheukfan Lee
*Attorney, Agent, or Firm*—Brinks Hofer Gilson & Lione

[57] ABSTRACT

A high-quality image is recorded in precise correspondence with the image information of a document sensed by an image scanner without producing an error in gray level. Control means performs a gray level correction on the image information sensed by the image scanner in accordance with the surface gray level information of a reference plate which has been sensed in advance by the image scanner thereby generating recording information corrected in gray level, wherein the gray level correction is performed when the recording information is generated from the image information thereby making compensation not only for the shading error but also for gray level errors due to other factors so that an image is recorded in exact correspondence with the sensed image information of the document without having an error in gray level. Correction values are set for each sensing element of the image scanner so that the corrected output value of each sensing element obtained in accordance with said correction values becomes proportional to the brightness. The image information sensed via the image sensing elements is corrected in accordance with the above correction values thereby generating a corrected output value.

5 Claims, 9 Drawing Sheets

SENSOR OUTPUT

SHADING CORRECTION COEFFICIENT

CORRECTION RESULT (IDEAL)

CORRECTION RESULT (PRACTICAL)

GRADIENT CORRECTION COEFFICIENT

GRADIENT CORRECTION RESULT

SENSOR OUTPUT

SHADING CORRECTION COEFFICIENT

CORRECTION RESULT (IDEAL)

CORRECTION RESULT (PRACTICAL)

GRADIENT CORRECTION COEFFICIENT

GRAY LEVEL CORRECTION COEFFICIENT

GRAY LEVEL CORRECTION RESULT

SENSOR OUTPUT

SHADING CORRECTION COEFFICIENT

CORRECTION RESULT (IDEAL)

CORRECTION RESULT (PRACTICAL)

IMAGE SENSING APPARATUS AND SHADING CORRECTION METHOD

BACKGROUND OF THE INVENTION

1. Field of the Invention

The present invention relates to an image sensing apparatus having an image scanner for sensing image information of a document, and more particularly, to an image sensing apparatus capable of recording an image precisely according to the image information obtained by scanning a document with an image scanner and also to a method of making a shading correction.

2. Description of the Related Art

Thermal transfer printers are now widely used. A typical thermal transfer printer operates as follows. That is, a recording medium is pinched between a carrying roller and a pressing roller which pressing the recording medium against the carrying roller, thereby carrying the recording medium to a location between a platen and a thermal head serving as recording means. Then, the thermal head mounted on a carriage is pressed against the recording medium at a predetermined amount of pressure. While maintaining the above pressure, the carriage is moved and the thermal head is activated in accordance with a given recording signal wherein an ink ribbon disposed in a ribbon cassette mounted on the carriage is wound during the above operation. As a result, the ink on the ink ribbon is melted and transferred to the recording medium and thus a desired image is recorded on the recording medium.

An image sensing means called an image scanner is used in a peripheral device of a computer system or used in a recording apparatus. In the image scanner, a document is illuminated by light emitted by a light source, and the light reflected from the document is sensed by a sensor device such as a CCD having a plurality of sensor elements arranged in an array form. Thus, the image information of the document is converted into an electric signal and the result is output.

The inventors of the present invention have developed a thermal transfer printer having an image scanner mounted on a carriage, wherein a document is carried between a platen and the carriage which is moved across the document thereby scanning the document by the image scanner. Thus, the image information of the document is sensed by the image scanner, and an image is recorded on a recording medium in accordance with the image information sensed.

The sensing of the image information of the document via the image scanner is performed as follows. The document is illuminated by light emitted from a light source member disposed on the image scanner. The image of the document is then sensed by detecting the light reflected from the document. Since the light source member includes a plurality of lamps or the like, the light rays emitted from those lamps partially overlap each other on the document. The overlapped areas produce a greater intensity of reflected light than the areas which are exposed to a single light ray without having an overlap. As a result, the image information sensed by the image scanner includes brightness information different from the true brightness of the image. That is, the sensed image becomes brighter in the overlapped areas than the true brightness, while the brightness of the sensed image for the other areas becomes lower than the brightness of the overlapped areas.

A similar variation in the output of the scanner can also occur due to other factors such as a variation in the intensity of light rays from the light source, an error of a lens, and a variation in the distance between the document and the CCD.

To avoid the problem of the variation in the output of the scanner, a correction is generally made as follows. That is, a white reference plate is prepared, and the brightness and the color (reference information) of the white reference plate is sensed before sensing the image information of a document via the image scanner. Correction reference data is then determined so that the output level of each CCD element for the reference information of the white reference plate becomes equal to a maximum level. Using this correction reference data, a shading correction is made so that the output level of each CCD element for the same color, which varies from element to element, is corrected to an equal level.

FIG. 8 illustrates the shading correction process. In FIGS. 8a–8d, each horizontal axis represents the location of CCD elements from one end to the opposite end of the sensor device of the image scanner. Each vertical axis represents the output level (gray level in the range from 0 to 255) of the respective CCD elements. When the white reference plate is sensed by the image scanner, those CCD elements located between two lamps of the image scanner have a high output level, while the CCD elements located outside either lamp have a low output level, as shown in FIG. 8a.

As can be seen from FIG. 8a, the output signal of the sensor of the image scanner has a curved characteristic resulting from the fact that CCD elements located in the central area have a high output level while those located near either end have a low output level.

To compensate for such the variation in the output level, a shading correction is made in such a manner that correction coefficients (having a value in the range of 0.5 to 1.5) are determined as shown in FIG. 8b such that the plots of correction coefficients are curved in an opposite direction to the characteristic curve of the sensor output signal shown in FIG. 8a, and the sensor output signal having such the characteristic shown in FIG. 8a is multiplied by the corresponding correction coefficient shown in FIG. 8b. As a result of the shading correction, the output of the sensor becomes flat along the X axis as shown in FIG. 8c.

In the conventional printer, however, when a document to be sensed by the image scanner is placed on a sensing position, if the document has an angle relative to the plane of the white reference plate, the output signal of the sensor obtained on the assumption that the white reference plate is located in a plane exactly identical to the document plane has an inclined linear characteristic which increases with the location toward the right as shown in FIG. 8d. This occurs even if the shading correction is made. Besides, the maximum-to-minimum difference in the level of the output signal in FIG. 8d becomes greater than that in FIG. 8a.

If the illumination area is illuminated by nonuniform intensity of light emitted from each lamp of the image scanner, when a photographic image is scanned by the image scanner, nonuniformity in gray level called white nonuniformity can occur in an image area having an achromatic color such as white or gray with high brightness.

As described above, if correction is performed simply according to the above shading correction technique, the image recorded in accordance with the image information obtained via the image scanner has a gray level error at a recording element location above or below that corresponding to the sensor element. This causes degradation in the quality of the recorded image.

Furthermore, in the conventional shading correction technique described above, when an image with an intermediate gray level between the white level with the highest brightness (highest light intensity) and the black level with the lowest brightness (lowest light intensity) is sensed, the output level of each CCD element has a deviation from its ideal value.

That is, although the conventional shading correction technique can eliminate the white level variation among CCD elements by making a correction so that each CCD element has an equal output level for the white level, and no error occurs in the black level since the black level equally has a brightness of zero, an error occurs in the output level of the CCD element when an image with an intermediate gray level between the lowest brightness (black) and the highest brightness (white) is sensed. As shown in FIG. 10, the output level of each CCD element does not vary in proportion to the brightness (intensity of incident light). That is, the relationship between the intensity of incident light and the output level is not linear. Furthermore, such the relationship varies from one CCD element to another. As a result, even when an image with an uniform gray level is sensed by CCD elements, the output level varies from one CCD element to another, and thus nonuniformity in gray level occurs. The above errors is caused by the variation in the characteristics such as sensitivity among CCD elements and also the variation in the intensity of reflected light depending on the location.

SUMMARY OF THE INVENTION

It is an object of the present invention to provide a printer capable of recording a high-quality image precisely corresponding to the image information of a document sensed by an image scanner without producing a gray level error in the recorded image even when the document is carried to an inclined position relative to the position of the image scanner and regardless of the variation in the intensity of light emitted by a light source member of the image scanner.

It is another object of the present invention to provide control means for performing a gray level correction on the image information sensed by the image scanner in accordance with the surface gray level information of a reference plate which has been sensed in advance by the image scanner thereby generating recording information corrected in gray level, wherein the gray level correction is performed when the recording information is generated from the image information thereby making compensation not only for the shading error but also for gray level errors due to other factors so that an image is recorded in exact correspondence with the sensed image information of the document without having an error in gray level.

It is still another object of the present invention to provide a technique of preventing an image recorded in accordance with sensed image information of a document from having an error in gray level, by making gray level corrections in terms of the inclination of the document relative to a reference plate and also in terms of white nonuniformity due to the variation in illuminating light emitted by a light source member of an image scanner thereby ensuring that the image including no errors in gray level is recorded in precise correspondence with the sensed image information of the document regardless of the inclination of the document relative to the image scanner and regardless of the variation in the intensity of light of the light source member of the image scanner.

It is a further object of the present invention to provide a gray level correcting technique in which a reference gray level chart is sensed by an image scanner and gray level correction is performed on the basis of the chart information of the reference gray level wherein the sensing of the reference gray level chart is performed before starting the operation of sensing a document so that the gray level correction is precisely made by detecting the output signal of the sensor.

It is still another object of the present invention to provide a technique of preventing a variation in the output value among sensing elements of an image scanner even for a half-tone image.

DESCRIPTION OF THE PREFERRED EMBODIMENTS

Figure 1:
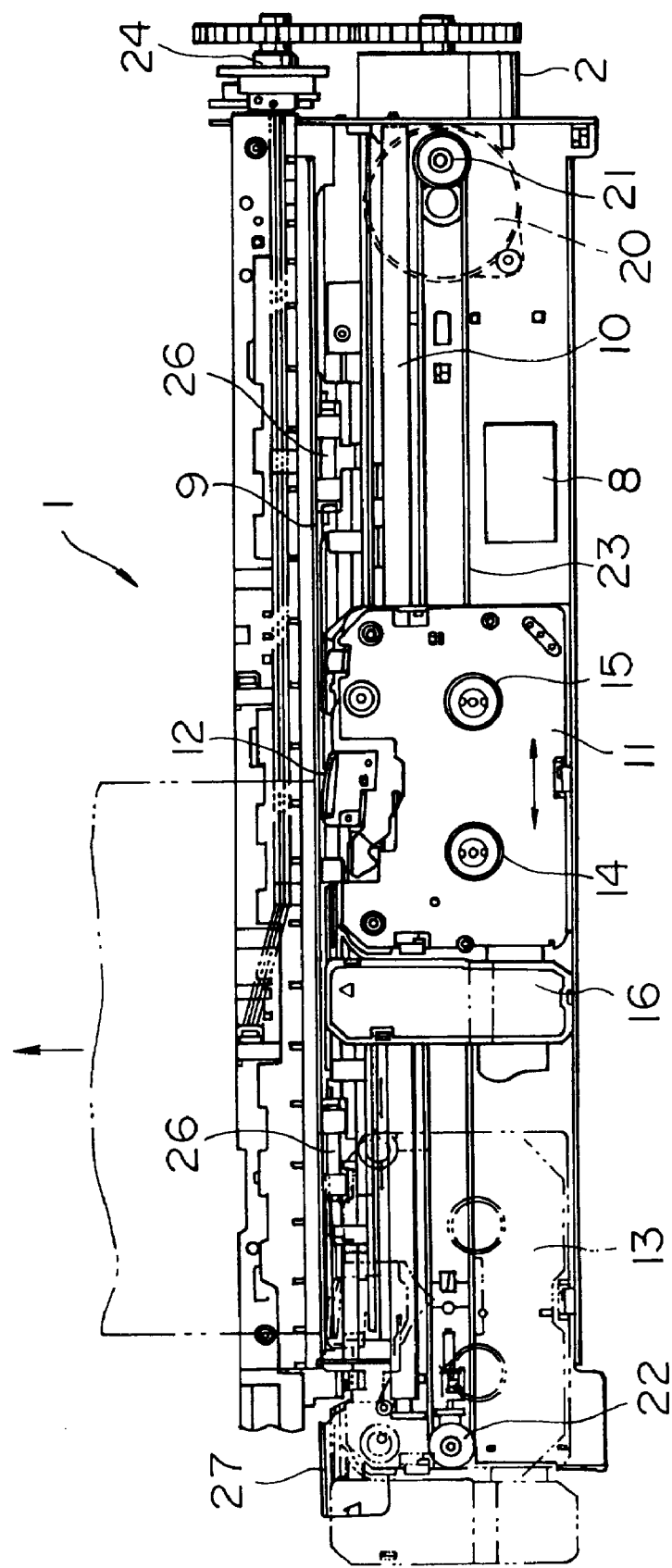
FIG. 1 is a plan view of a thermal transfer printer according to an embodiment of the invention.

A first embodiment of the invention will be described below.

FIGS. 1 to 4 illustrate a thermal transfer printer including an image sensing apparatus according to the first embodiment of the invention. The frame 8 of the printer 1 has a platen 9 in the form of a flat plate extending in the longitudinal direction of the frame 8. A carriage shaft 10 is disposed at a front position in the frame such that the carriage shaft 10 extends in parallel to the platen 9 and between both side faces of the frame 8. A carriage 11 is mounted on the carriage shaft 10 so that the carriage 11 can move in either direction along the carriage shaft 10. A thermal head 12 serving as recording means is attached to an end of the carriage 11 so that the thermal head 12 faces the platen 9 and so that the thermal head 12 can move toward the platen or in an opposite direction as required.

Furthermore, a ribbon cassette 13 containing an ink ribbon (not shown) therein is removably placed on the upper surface of the carriage 11 so that the ink ribbon passes between the thermal head 12 and the platen 9. A winding bobbin 14 for winding the ink ribbon contained in the ribbon cassette 13 and a feeding bobbin 15 for feeding the ink ribbon are disposed on the upper surface of the carriage 11.

Figure 2:
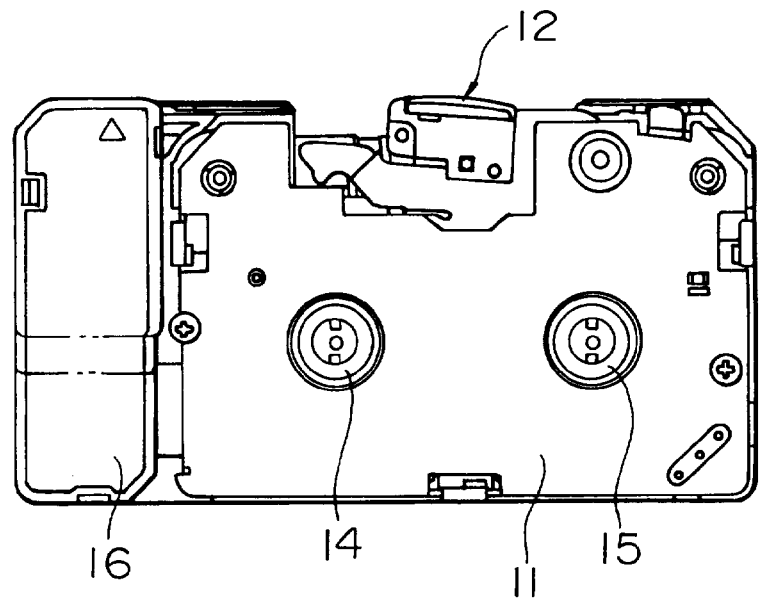
FIG. 2 is a plan view illustrating the carriage shown in FIG. 1.
Figure 3:
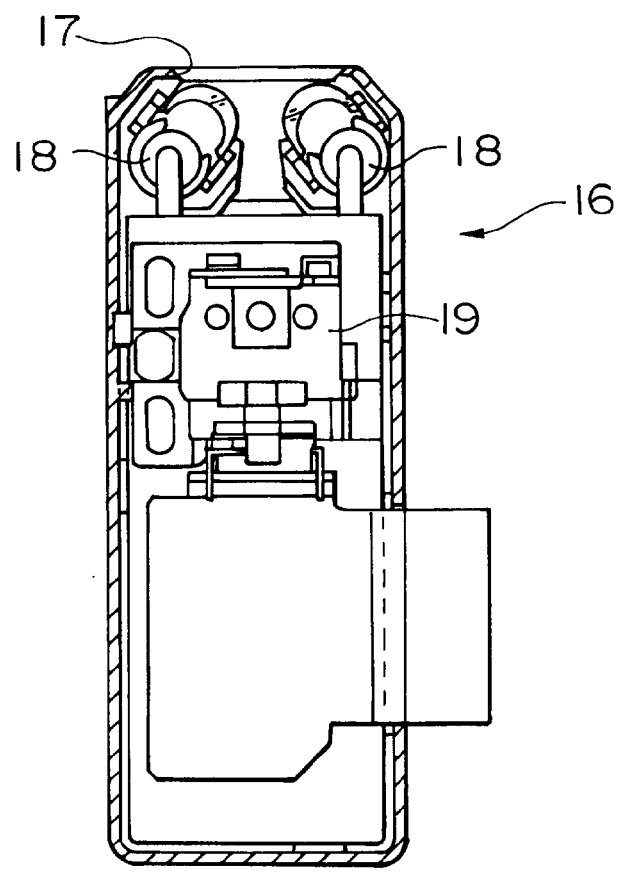
FIG. 3 is a plan view illustrating the image scanner shown in FIG. 1.

In the present embodiment, as shown in FIG. 2, an image scanner 16 is disposed at one side of the carriage 11. As shown ion FIG. 3, the image scanner 16 has an opening 17 formed in its side wall facing the platen 9. Two light source members 18 each including a lamp or the like are disposed in the image scanner 16, at either side of the opening 17 such that each light source member 18 is directed toward the opening 17. The image scanner 16 also has, in its inside, an image sensor unit 19 which receives, via a lens (not shown), light which is reflected from a document after being emitted from the light source members 18. The sensor of the image sensor unit 19 is made up of a plurality of sensing elements such as CCD elements (not shown) arranged in an array form, for sensing the above reflected light. The sensor provides an output signal generated by each sensing element in accordance with the intensity of light incident on each sensing element. Since the reflectivity of light at the document surface varies depending on the intensity of the image information of the document, the output signal of the sensor corresponds to the image information.

A carriage driving motor 20 is disposed in the frame 8, at its bottom near its one end in such a manner that the output shaft of the carriage driving motor extends through the upper surface of the frame 8. A driving pulley 21 is disposed on the output shaft of the carriage driving motor 20 so that the pulley 21 is rotated by the carriage driving motor 20. Furthermore, a driven pulley 22 is rotatably disposed in the frame 8, at the top and near the other end. The driving pulley 21 and the driven pulley 22 are connected via a carriage driving belt 23 wherein a part of the carriage driving belt 23 is connected to the lower surface of the carriage 11. When the carriage driving motor 20 is activated, the carriage driving belt 23 is driven via the driving pulley 21 thereby moving the carriage 11 in either direction along the carriage shaft 10 in parallel to the platen 9.

Furthermore, a carrying roller 24 for carrying a given recording medium at a predetermined speed is disposed behind and under the platen 9. A plurality of pressing rollers 25 are disposed beneath the carrying roller 24 in a freely rotatable fashion. A paper feeder (not shown) is disposed at the rear of the frame 8. Sheets of documents or documents held in document holders and sheets of recording media such as copying paper are alternately placed on the paper feeder. The carrying roller 24 is driven and rotated by a carrying motor (not shown) so that a document holder and a recording medium fed from the paper feeder are pinched between the carrying roller 24 and the pressing rollers 25 and are carried to a location between the thermal head 12 and the platen 9. Furthermore, a feeding-out roller 26 is disposed above the platen 9 so that the recording medium is guided by the feeding-out roller 26 after completion of recording process.

A white reference plate 27, which serves as a reference plate used in the shading correction process during the sensing operation by the image scanner 16, is disposed in the frame 8 at one side of the platen 9. The surface of the white reference plate 27 is formed to have an uniform white color including no pattern.

Figure 5:
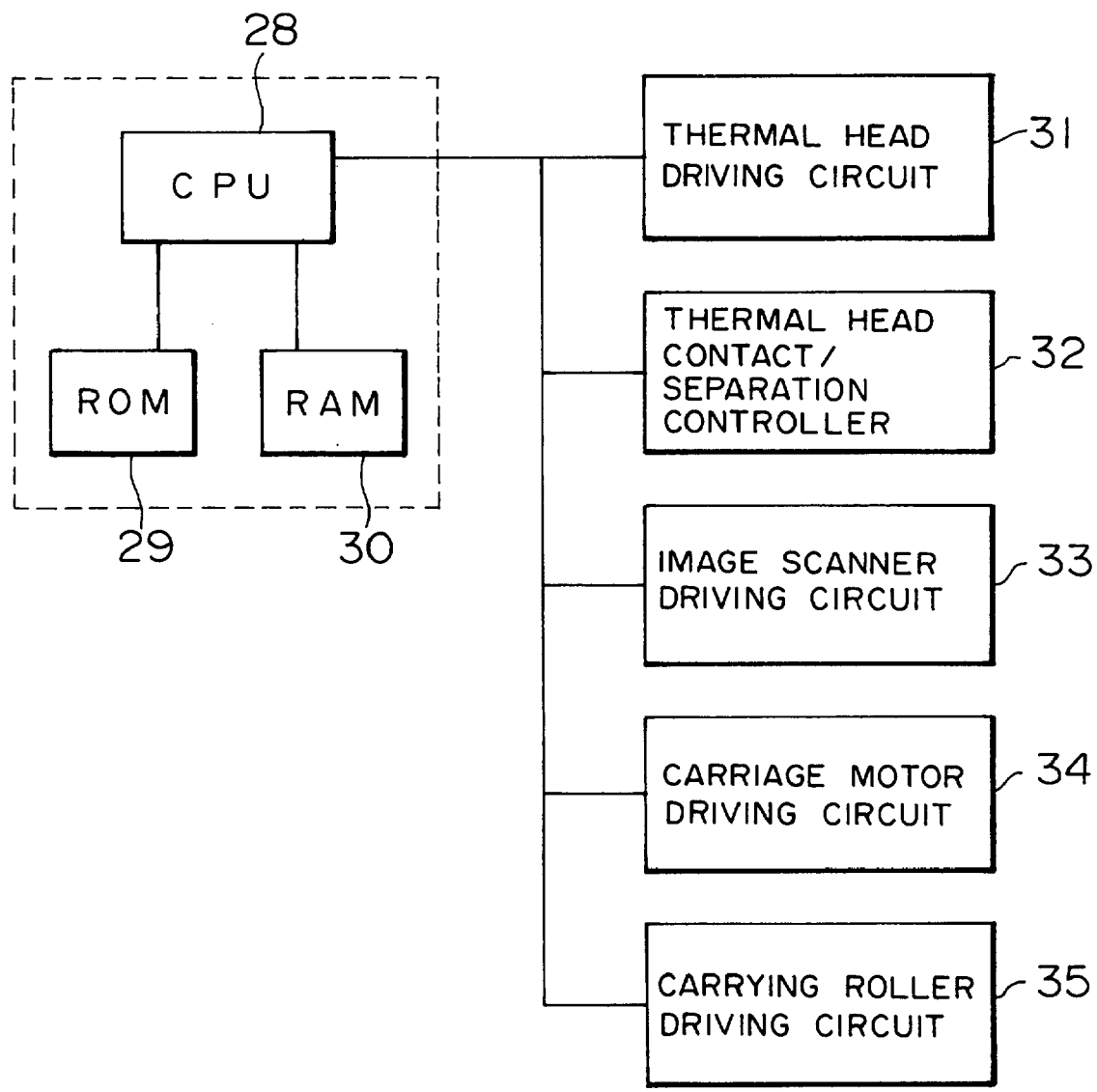
FIG. 5 is a block diagram illustrating a controlling apparatus used in the thermal transfer printer shown in FIG. 1.

FIG. 5 illustrates control means used in the image sensing apparatus according to the present embodiment. A CPU 28 is connected to a ROM 29 for storing recording conditions depending on the type of the recording medium used, and also connected to a RAM 30 used to store various data. The CPU 28 receives image information sensed by the image scanner 16, and sends various control signals to various components such as a thermal head driving circuit 31 for controlling the on/off operation of the thermal head 12, a thermal head contact/separation controller 32 for moving the thermal head 12 in either direction toward the platen 9 or in an opposite direction, an image scanner driving circuit 33 for controlling the operation of the image scanner 16, a carriage driving motor driver 34, and a carrying roller driving circuit 35.

The gray level of the image information sensed by the image scanner 16 is corrected as follows.

Gray level correction is required when a document to be sensed by the image scanner 16 is placed at the sensing position at an angle with respect to the plane of the white reference plate 27. If the document is placed at an angle with respect to the plane of the white reference plate 27, when an image is formed on a recording medium in accordance with the sensed image information of the document, a gray level error occurs in the image formed on the recording medium due to the difference in angle between the white reference plate 27 and the document. This type of error occurs even if a shading correction is made in accordance with the information of the reference white level obtained by scanning the white reference plate 27 via the image scanner 16, and therefore, the gray level correction is required to eliminate such the error.

FIG. 6 illustrates the gray level correction process performed after the shading correction process, according to the present embodiment. In each graph shown in FIG. 6, the horizontal axis represents the location of CCD elements along a line from one end to the other end of the sensor of the image scanner 16, and the vertical axis represents the output level (gray level in the range from 0 to 255) of each CCD element.

Figure 6A:
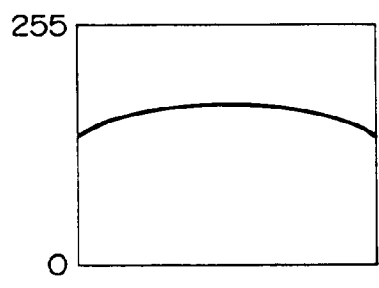
FIGS. 6A through 6F are graphs illustrating a specific example of the gray level correction process performed in the thermal transfer printer shown in FIG. 1.

FIG. 6a illustrates the output level of each CCD element obtained when the image scanner 16 scans the white reference plate 27. As can be seen, the output level of those CCD elements located between the two light source members 18 of the image scanner is rather high, while the output level of CCD elements located at the outside of either of the two light source members 18 is rather low.

Thus, as shown in FIG. 6a, the output level of the sensor of the image scanner 16 is curved in such a manner that the output level decreases from its highest value of the CCD element at the central position with the location toward either end of the sensor.

Figure 6B:
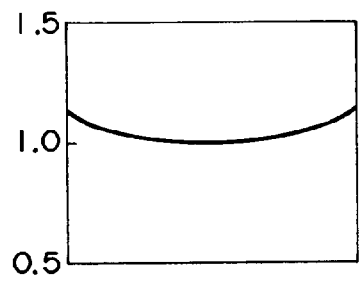
Figure 6C:
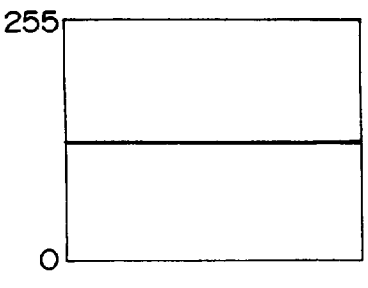
Figure 6D:
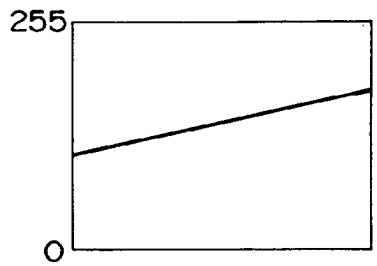

To compensate for such the variation in the output level, a shading correction is made in such a manner that correction coefficients are determined as shown in FIG. 6b such that the plots of correction coefficients are curved in an opposite direction to the sensor output level shown in FIG. 6a, and the sensor output signal shown in FIG. 6a is multiplied by the correction coefficient shown in FIG. 6b. Ideally, the output of the sensor becomes flat along the X axis as shown in FIG. 6c as a result of the above shading correction. In practice, however, if a document to be sensed by the image scanner is placed on a sensing position at an angle relative to the plane of the white reference plate, the output signal generated by the sensor on the assumption that the white reference plate is located in a plane exactly coincident with the document plane has an inclined linear characteristic which increases with the location toward the right as shown in FIG. 6d, wherein the above inclination occurs even if the shading correction is made. What is worse is that the maximum-to-minimum difference in the level of the output in FIG. 6d becomes greater than that in FIG. 6a.

Figure 6E:
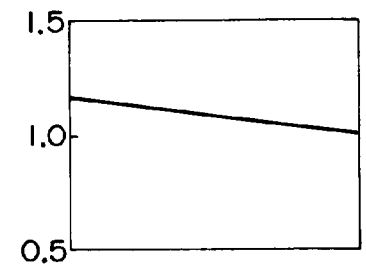
Figure 6F:
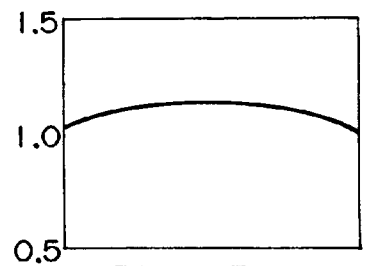

The difference in angle between the document and the white reference plate 27 can be compensated for as follows. The angle of the white reference plate 27 can be easily detected when various components are assembled into a printer 1. Furthermore, when the assembling process of the printer 1 is completed, the document angle can also be determined easily by detecting the angle of a document with a document holder placed in the sensing position. Therefore, it is possible to detect the difference in angle between the white reference plate 27 and the document when the assembling process of the printer 1 is completed. The correction coefficients are calculated, as shown in FIG. 6e, in accordance with the difference in angle between the white reference plate 27 and the document. The output signal of the sensor is multiplied by the obtained correction coefficients. As a result, the output signal has corrected values as shown in FIG. 6f. The maximum-to-minimum difference in the corrected output level shown in FIG. 6f is smaller than that shown in FIG. 6d.

Therefore, if the output level shown in FIG. 6f is employed as a reference level, the gray level correction for compensating for the angle difference between the white reference plate 27 and the document in addition to the shading correction is performed, and thus a high-quality image including no gray level error can be recorded.

If the illumination area is illuminated by nonuniform intensity of light emitted from each light source member of the image scanner 16, nonuniformity in gray level called white nonuniformity occurs in an image area having a high-brightness achromatic color, such as white or gray, when a photographic image is scanned by the image scanner. It is desirable that such the gray level error due to the white nonuniformity be compensated for by performing an additional gray level correction in addition to the shading correction and the gray level correction for compensating for the above angle difference, thereby further improving the quality of the recorded image.

FIG. 7 illustrates a correction process according to the present embodiment of the invention, in which the correction process includes a white nonuniformity correction in addition to the corrections described above. The correction process steps shown in FIGS. 7a–7e are similar to those in FIGS. 6a–6e.

Figure 7A:
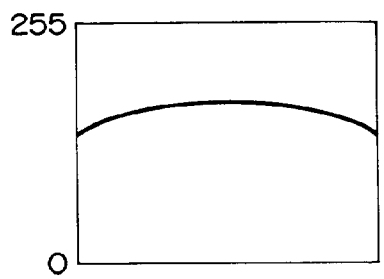
FIGS. 7A through 7G are graphs illustrating another specific example of the gray level correction process performed in the thermal transfer printer shown in FIG. 1.
Figure 7B:
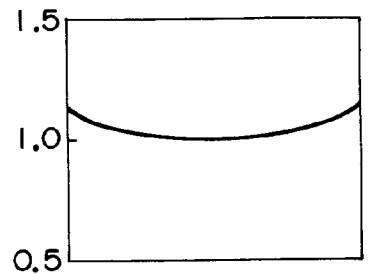
Figure 7C:
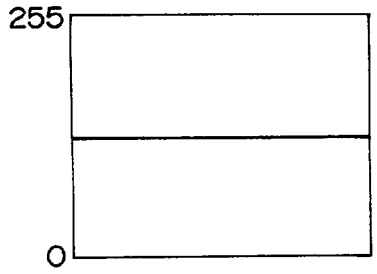
Figure 7D:
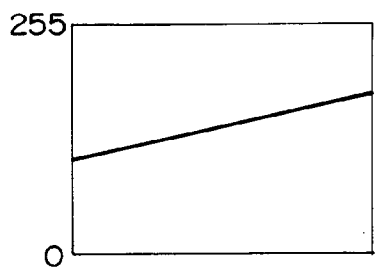
Figure 7E:
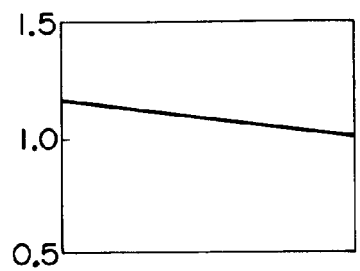
Figure 7F:
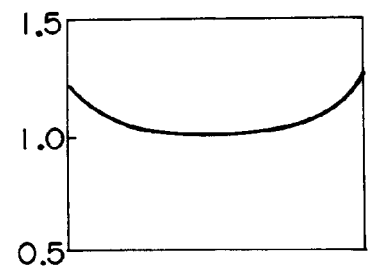
Figure 7G:
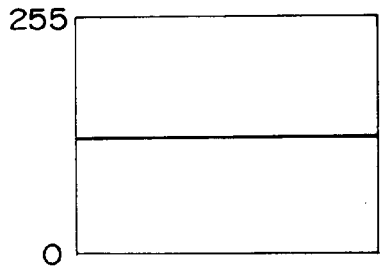
Figure 8A:
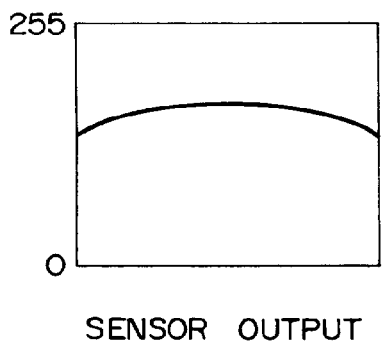
FIGS. 8A through 8D are graphs illustrating an example of shading correction process employed in a conventional printer.
Figure 8B:
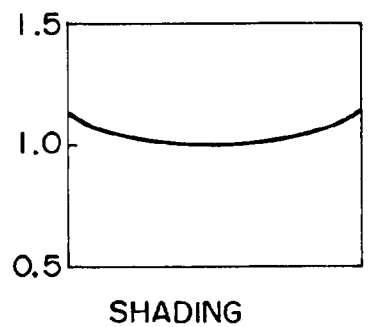
Figure 8C:
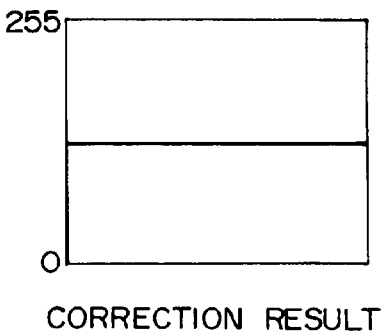
Figure 8D:
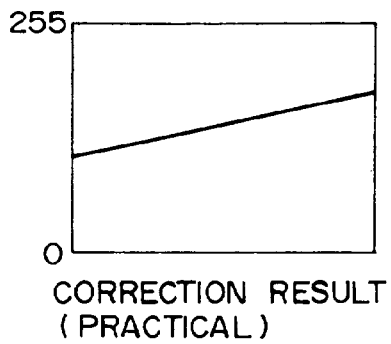

After determining the correction coefficients based on the detection of the white reference plate 27 and those for compensating for the document inclination in the processing steps shown in FIGS. 7a–7e, the sensor output signal shown in FIG. 7d is multiplied by the correction coefficients shown in FIG. 7e and also by the correction coefficients shown in FIG. 7f for making compensation for the white nonuniformity, wherein the coefficients shown in FIG. 7f are determined in advance. As a result, a corrected output signal is obtained as shown in FIG. 7g. As can be seen from comparison between FIG. 7d and FIG. 7g, the corrected output signal shown in FIG. 7d includes substantially no different in level.

Therefore, if the output signal shown in FIG. 7g is employed as a reference level, not only the shading correction but also the gray level corrections for compensating for the angle difference between the white reference plate 27 and the angle and furthermore for compensating for the white nonuniformity are performed. Thus a high-quality image including no gray level error can be recorded.

The operation of the image sensing apparatus constructed in the above-described manner according to the present embodiment will be described below.

In the case where documents each held in document holders are sensed and then corresponding images are recorded on recording media by the thermal transfer printer 1, documents holders each holding documents therein and recording media are alternately placed on the paper feeder.

In response to a control signal generated by the CPU 28, the carrying roller 24 is driven and rotated so that a document holder fed from the paper feeder is pinched between the carrying roller 24 and the pressing rollers 25 and is carried to a location between the thermal head 12 and the platen 9.

In response to another control signal generated by the CPU 28, the image scanner 16 scans the white reference plate 27 to obtain a white reference level used in the shading correction process. The output signal of the sensor is input to the RAM 30. The RAM 30 includes the inclination correction coefficients shown in FIG. 6e or both the inclination correction coefficients and the white nonuniformity correction coefficients shown in FIGS. 7e and 7f, which have been stored in advance, and the output signal of the sensor corrected in terms of the shading error is further corrected by being multiplied by these correction coefficients.

In response to a further control signal generated by the CPU 28, the carriage driving motor 20 is activated so as to move the carriage 11 thereby scanning the image scanner 16 across the document in its lateral direction. As the image scanner 16 moves to the right across the document, the document is illuminated by light from the light source members 18 and the light reflected from the document is sensed by the image sensor unit 19. In this way, the image information is detected across the document in its lateral direction. The CPU 28 makes correction on the output signal representing the image information on the basis of the correction coefficients stored in the RAM 30, and stores the resultant corrected image information in the RAM 30.

After that, the document holder is moved by a predetermined amount by the carrying roller 24, and the carriage 11 is moved again so as to detect image information across the document along a next line. The CPU 28 also makes correction on the output signal representing the image information on the basis of the correction coefficients stored in the RAM 30, and stores the resultant corrected image information in the RAM 30.

The feeding of the document and the sensing of the image information via the image scanner 16 are performed alternately as described above. When the image information has been completely sensed for the entire area of the document, the document holder including the document therein is fed out. Thus, the operation of sensing the image information of the document is completed.

The CPU 28 generates a further control signal so as to rotate the carrying roller 24 so that a recording medium fed from the paper feeder is pinched between the carrying roller 24 and the pressing roller 25, and is carried to a location between the thermal head 12 and the platen 9. Then, the CPU 28 generates a control signal so that the thermal head 12 is pressed against the platen 9. As the carriage 11 is moved by the carriage driving motor 20 and the ink ribbon is wound by means of rotation of the winding bobbin while maintaining the thermal head 12 pressed against the platen 9, heating elements of the thermal head 12 are selectively activated in accordance with the image information stored in the RAM 30 so that an image is recorded on the recording medium in accordance with the corrected output signal. As described above, the output signal used in the above recording operation has been subjected not only to the shading correction but also to the corrections based on the inclination correction coefficients shown in FIG. 6e or both the inclination correction coefficients and the white nonuniformity correction coefficients shown in FIGS. 7e and 7f.

Thus, in the present embodiment, the image information of the document sensed by the image scanner 16 is converted into recording information corrected in terms of the shading and gray level errors, and an image including no gray level errors is recorded.

The present invention is not limited to the above embodiment, and various modifications can be made as required.

For example, although in the above embodiment, the white reference plate 27 used as the reference plate for the shading correction is disposed on the extension of the longitudinal axis of the platen 9, the reference plate may be disposed on the document holder for holding a document to be sensed.

Furthermore, although in the above embodiment, the inclination correction coefficients and the white nonuniformity correction coefficients used in the gray level correction are determined when components have been assembled into a printer 1, the gray level correction coefficients including the inclination correction coefficients and the white nonuniformity correction coefficients may be determined immediately before starting sensing a document by the image scanner.

To this end, a sheet called a reference gray level chart is used. On the surface of the reference gray level chart to be sensed by the image scanner, a simple and uniform gray color pattern having a reflectivity of for example 50% is formed.

Before scanning an actual document, the reference gray level chart is attached to the document holder, and the surface having the 50% reflectivity gray color of the reference gray level chart is scanned by the image scanner. The sensed image information of the reference gray level chart is subjected to the shading correction in a manner similar to the above-described embodiment. Then the gray level correction coefficients are determined on the basis of the above shading-corrected output signal of the sensor. The shading-corrected output signal is then multiplied by the above gray level correction coefficients thereby obtaining the final output signal. If this final output signal has a flat and linear characteristic having no variation in level, then the above gray level correction coefficients can be used to correct the image information of an actual document. That is, the image information of the actual document can be properly corrected by means of multiplying the output signal by the above gray level correction coefficients. On the other hand, if the final output signal has a curved characteristic with a variation in level, the reference gray level chart is scanned again by the image scanner.

As described above, more accurate gray level correction can be achieved by employing the correction coefficients determined on the basis of the output signal of the sensor of the image scanner obtained for the reference gray level chart.

In the image sensing apparatus according to the present invention, as described above, it is possible to record a high-quality image precisely corresponding to the image information of an original document without producing a gray level error in the recorded image even when the document is carried to an inclined position relative to the position of the image scanner and regardless of the variation in the intensity of light emitted by the light source members of the image scanner.

Now, a second embodiment of the present invention is described below.

Figure 9:
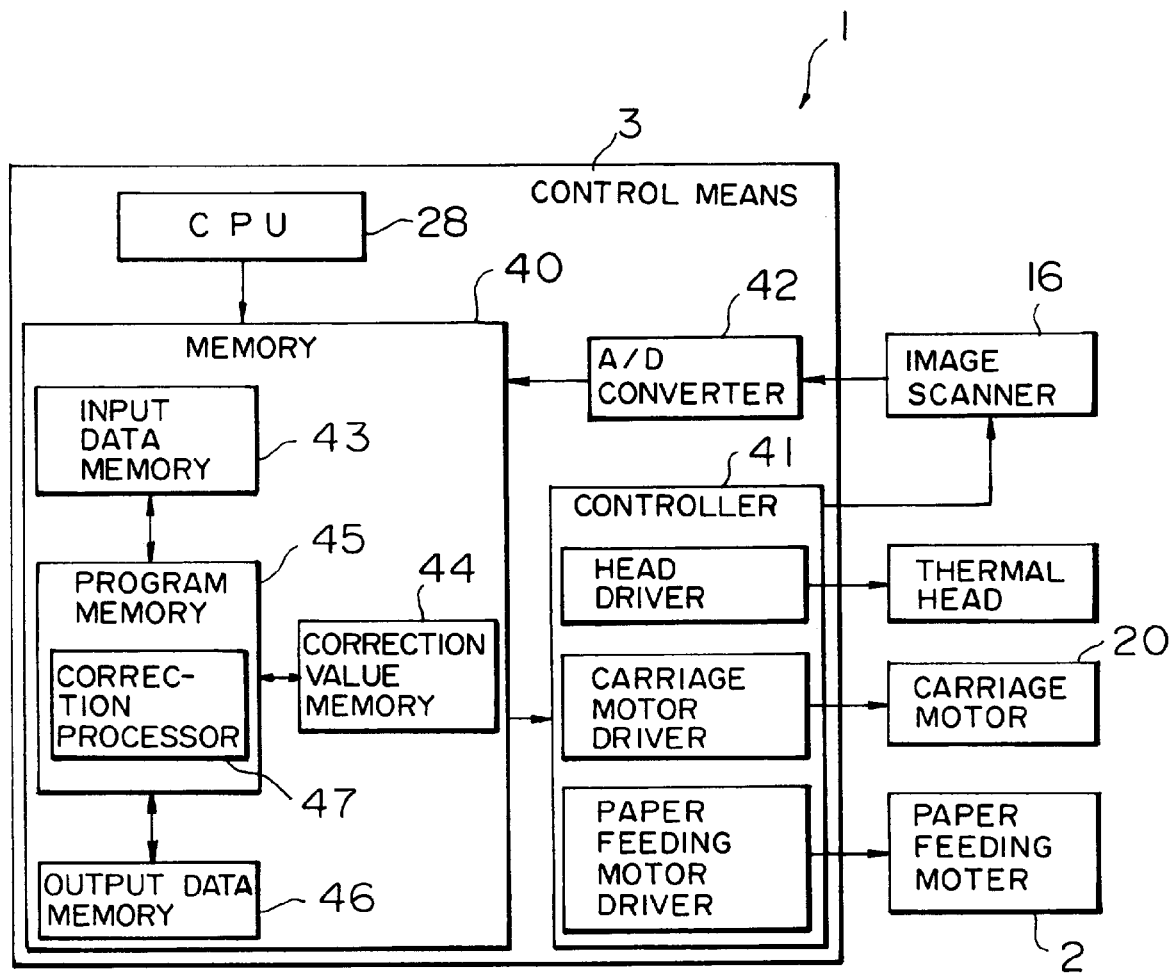
FIG. 9 is a block diagram illustrating the main parts of control means in the thermal transfer printer shown in FIG. 1.

An image processing apparatus according to this second embodiment of the invention is employed in a printer serving as a recording apparatus which has a similar structure to that employed in the first embodiment and which operates in a similar manner, although no further description is given here. FIG. 9 illustrates a controlling apparatus for controlling the thermal transfer printer 1, according to the present embodiment. The controlling apparatus includes at least a CPU 28, a memory 40 composed of a ROM and/or RAM or the like with a proper capacity, and a controller 41 for controlling various parts of the printer 1.

The memory 40 includes: an input data memory 43 for storing at least image data obtained by converting the output signal of the image scanner 16 into a digital electric signal via an A/D converter 42, and also input data representing the brightness or gray level of an image; a correction value memory 44 for storing a correction equation or correction table used to make a correction on the output value (output voltage) of the image sensor unit 19 so that the output value becomes proportional to the intensity (brightness) of light sensed by each CCD element; a program memory 45 for storing various programs; and an output data memory 46 for storing various output data such as recording data according to which an image is to be recorded, control data for controlling the input of the image data, and control data for controlling the recording operation.

Figure 10:
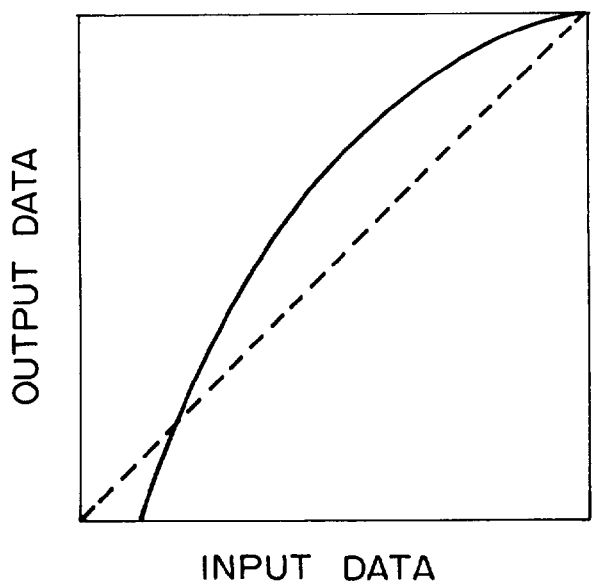
FIG. 10 is a graph illustrating an example of a correction table stored in the correction value memory shown in FIG. 9.
Figure 11:
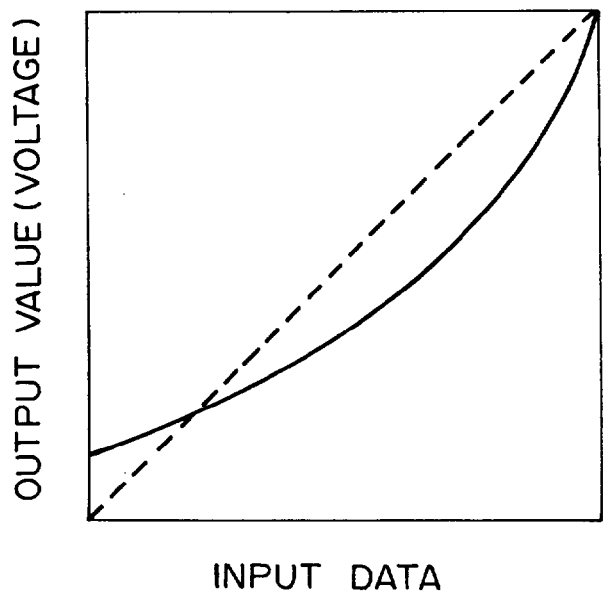
FIG. 11 is a graph illustrating the relationship between the brightness of image information (intensity of incident light) and the output of a sensing element for a typical conventional image scanner.

The correction table or the correction equation stored in the correction value memory 44 includes, as shown in FIG. 10, correction values for various input data representing the brightness, wherein the corrected output data (output values) becomes proportional to the input data. The correction values defined in FIG. 10 as the relationship between the input data and the output data are determined so that the output value of the CCD element having the input-output characteristic shown in FIG. 11 can be properly corrected. These correction values are set for each CCD element on the basis of the test data. Thus, the input data is corrected according to the above correction values so that the output value for the half-tone input becomes proportional to the brightness of the input without having a difference in the output level among CCD elements for the same input brightness.

The program memory 45 includes a correction program memory 47 storing a program for performing a calculation process to convert the image information of a document sensed by each CCD element to a shading-corrected output value (output data) in accordance with the correction table or correction equation which is determined for each CCD element and is stored in the correction value memory 44.

The program memory 45 also stores various programs including: a program for separating the image data (output data) into three primary colors consisting of Y (yellow), C (cyan), and M (magenta) thereby producing color image data consisting of Y image data, C image data, and M image data; a program for producing recording data to be used in a recording operation, for each color on the basis of the respective color image data; a program for analyzing the input data provided from the image scanner 16 (the data obtained as a result of the scanning operation) to detect the presence/absence of a document or paper and also detecting the leading edge of the document or paper moving in a secondary scanning direction; a program for analyzing the input data from the image scanner 16 to detect the both ends of the document or paper in the main scanning direction; a program for detecting the base position of the carriage 11; a program for transferring the recording data to the output data memory 46 line by line (recording line) in a predetermined order of colors during the recording operation; and a recording program for controlling various parts during the operation of recording the image information of the document on paper such as postcard paper. During the recording operation, the recording program transfers all recording data produced for each color to the output data memory 46. According to the program stored in the correction program memory 47 of the program memory 45, the CPU 28 produces recording data for each color and stores the resultant recording data for each color in the output data memory 46.

The above-described input data memory 43, correction value memory 44, and correction program memory 47 form the image processing apparatus of the present embodiment according to the invention.

Although in the present embodiment, the image processing apparatus is disposed in the control means 3 of the printer 1, the image processing apparatus may be disposed in the image scanner 16. Furthermore, the control means 3 is not limited to the structure employed in the present embodiment. For example, the control means 3 may be divided into a plurality of separate parts.

The operation of the present embodiment constructed in the above-described manner will be described below.

Figure 4:
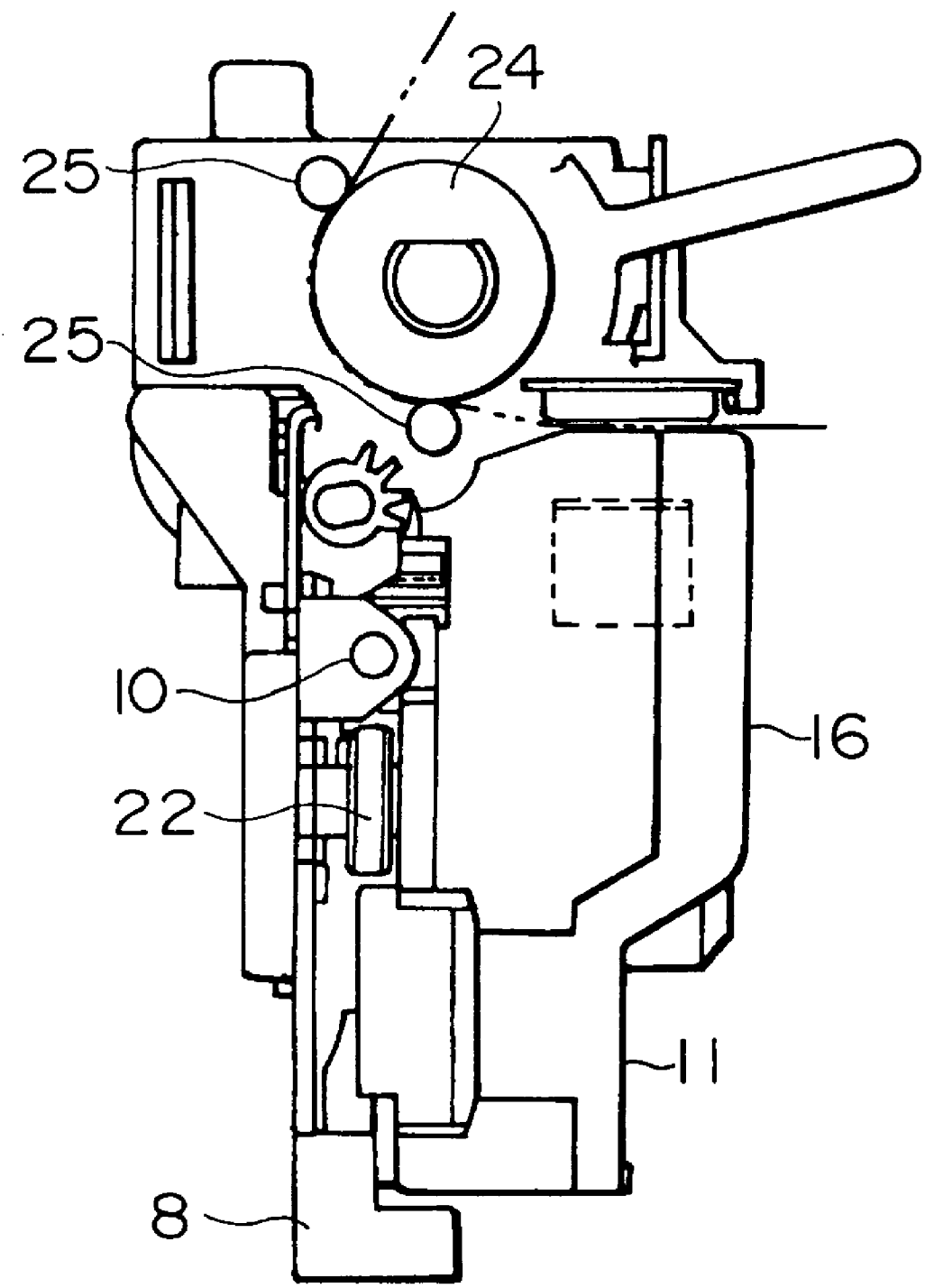
FIG. 4 is a side view of FIG. 1.

At the first step of sensing image information of a document with the printer 1 according to the present embodiment, the document is manually set so that the leading end of the document is located between the carrying roller 24 and the pressing roller 25 located on the bottom and left side of the carrying roller 24, as shown in FIG. 4. When the document is set, the control means 3 transmits control signals, according to the program stored in the memory 40, to the image scanner 16, the carriage driving motor 20, and the paper feeding motor 2. As a result, the light source members 18 of the image scanner 16 are turned on and thus activated, the carriage 11 starts to move toward the home position HP shown on the left side of FIG. 1 across the platen 9 in the main scanning direction of the image scanner 16, and the document starts to move in the secondary scanning direction of the image scanner 16. If the carriage 11 is located at the home position HP at the beginning of the operation, the carriage 11 is first moved to the right position, and then the carriage is moved again to the home position HP. The light source members 18 of the image scanner 16 are turned on and are in the active state not only in the image sensing operation but also in the recording operation.

When the image scanner 16 moves toward the home position HP in the main scanning direction, the image scanner 16 senses all information of objects present in front of the image scanner 16. Then the document is positioned to a starting position using the data obtained in the above scanning operation, before stating sensing the image information of the document.

In the above operation, the input data sensed by the image scanner 16 (all data obtained by the scanning operation) is converted by the A/D converter 42, as shown in FIG. 9, into a digital electric signal, and stored in the input data memory 43 of the memory 40.

In accordance with the program stored in the program memory 45, the CPU 28 detects the presence/absence of the document, the position of the leading end of the document, the positions of the side ends of the document, and the base position of the carriage 11. Depending on the result of the above detection, the control means 3 transmits control signals to the carriage motor 20 and the paper feeding motor 2 so that the document is precisely positioned at its starting position.

Then the sensing of the image information of the document is started. In response to the control signal generated by the control means 3, the carriage driving motor 20 moves the carriage 11 to the right position in FIG. 1. Then one line of image information of the document is sensed by the respective CCD elements of the image sensor unit 19 of the image scanner 16. After completion of the operation of sensing one line of image information of the document, the control means 3 generates a control signal to the paper feeding motor 2 so that the document is moved by an amount corresponding to one line in the secondary scanning direction perpendicular to the main scanning direction of the image scanner 16.

The above operation of scanning the document by the image scanner 16 along one line of the document in the main scanning direction and then moving the document by an amount corresponding to one line in the secondary scanning direction perpendicular to the main direction of the image scanner 16 is performed repeatedly line by line until all image information of the document is sensed. During the above operation, the image information is converted by the A/D converter 42 to a digital electric signal and stored in the input data memory 43 of the memory 40.

The image information of the document sensed line by line via the image scanner 16 is converted by the CPU 28, in accordance with the program stored in the correction program memory 47, to shading-corrected output values (output data) on the basis of the correction table or correction equation which represents the corrected value corresponding to the brightness of the image information and which is stored in the correction value memory 44. After that, various data processing is performed, and the resultant data is sequentially stored as recording information in the output data memory.

In summary, the image data of the document is processed in the printer 1 of the present embodiment as follows. A correction table or correction equation used to determine the output value proportional to the brightness of the incident light is created for each color and for each CCD element, and the resultant correction table or correction equation is stored in the correction value memory 44. Using the correction table or correction equation which is prepared for each CCD element and is stored in the correction value memory 44, the CPU 28 performs shading correction on the image information sensed via the image scanner 16 thereby generating corrected output values (output data). Various processing (editing processing required to obtain output data in a desired form) is further performed, and all data processing is completed.

In the present embodiment, as described above, the output signal of each CCD element is corrected to a value proportional to the brightness of the incident light, and thus no error occurs in the output signal of any CCD element even for a half-tone image. As a result, it is possible to obtain a high-quality recorded image precisely corresponding to an original image.

What is claimed is:

1. A printer with an image reading device, comprising:
a recording head driven in response to a recording signal;
an image scanner attached with said recording head for reading image information recorded on a document;
a reference plate arranged out of a recording region of said recording head so that before said image scanner starts reading the image information from said document, the surface concentration of said reference plate is sensed;

a sheet feeding mechanism for transferring a recording sheet and for transferring the document read by said image scanner;

control means for correcting a concentration of the image information of said document read out by said image scanner in response to a reading of the surface concentration information of said reference plate and for making a recording information, wherein, said control means performs both a concentration correction to compensate for non-coincidence in inclination of said document with respect to said reference plate and a correction of white nonuniformity caused by disturbance in a range of radiation of a light emitting member of said image scanner so as to make a recording information, and said recording head is driven with a recording signal based on the recording information so as to perform a recording on the recording sheet.

2. A printer with an image reading device according to claim 1, wherein, a concentration reference chart is read before reading image information in said document with said image scanner and a concentration is corrected on the basis of the chart information in this concentration reference chart.

3. A method of performing a shading correction on an image sensing means for sensing image information of a document so as to correct the sensitivity variation among a plurality of sensing elements disposed in an array form on said image sensing means, said method comprising the steps of:

providing a reference plate;

setting correction values for each sensing element so that said correction values represent the corrected output values of the respective sensing elements proportional to the brightness;

determining the corrected output values for the image information sensed by said image sensing elements by performing correction on the image information sensed by said image sensing elements in accordance with said correction values;

performing a concentration correction to compensate for non-coincidence in inclination of said document with respect to said reference plate; and performing a correction of white nonuniformity caused by disturbance in a range of radiation of a light emitting member.

4. A method of performing a shading correction, according to claim 3, wherein said correction values for the image information are read by referring to correction tables prepared for the respective sensing elements.

5. A method of performing a shading correction, according to claim 3, wherein said corrected output values are determined by substituting the image information into correction equations prepared for the respective sensing elements.

* * * * *

UNITED STATES PATENT AND TRADEMARK OFFICE
CERTIFICATE OF CORRECTION

PATENT NO.     : 6,075,621
DATED          : June 13, 2000
INVENTOR(S)    : Minoru Takeuchi et al.

It is certified that error appears in the above-identified patent and that said Letters Patent is hereby corrected as shown below:

<u>Title page,</u>
Item [73], change "Apls" to -- Alps --.

Signed and Sealed this

Twenty-sixth Day of February, 2002

*Attest:*

JAMES E. ROGAN
*Attesting Officer*     *Director of the United States Patent and Trademark Office*